United States Patent [19]
Hood et al.

[11] Patent Number: 5,049,641
[45] Date of Patent: Sep. 17, 1991

[54] RUBBER COMPOUNDING RESIN

[75] Inventors: Richard T. Hood, Murrysville; Robert M. Lamars, Pittsburgh, both of Pa.

[73] Assignee: Indspec Chemical Corporation, Pittsburgh, Pa.

[21] Appl. No.: 214,325

[22] Filed: Jul. 1, 1988

[51] Int. Cl.⁵ .............................................. C08G 14/04
[52] U.S. Cl. .................................... 528/155; 528/159; 528/153
[58] Field of Search ...................... 528/155, 159, 153

[56] References Cited

U.S. PATENT DOCUMENTS 2,079,210  12/1934  Honel ................................. 528/153
3,228,899  1/1966  Elmer et al. ..................... 528/159 X Primary Examiner—Morton Foelak
Assistant Examiner—Kathryne Shelborne
Attorney, Agent, or Firm—Herbert J. Zeh, Jr.; Michael J. Kline; Craig G. Cochenour

[57] ABSTRACT

A rubber compounding resin which is low fuming, nonhygroscopic and low in free resorcinol. It is made by first reacting resorcinol or other phenolic compound and styrene or other vinyl compound in a molar ratio of 1.0 mole of resorcinol to 0.25 to 1.0 mole of styrene after which formaldehyde or other aldehyde is added in the amount of 0.5 to 0.7 moles. Alternatively, the resorcinol can first be reacted with the formaldehyde after which the styrene is added. The composition resulting from the above procedure has been identified as having the structure

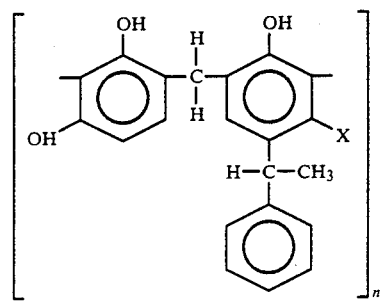

wherein X is hydroxyl, hydrogen or an alkyl group having 1 to 4 carbon atoms. An intermediate in making the above compound has been identified as having the structure.

1 Claim, 2 Drawing Sheets

RUBBER COMPOUNDING RESIN

Background of the Invention

1. Field of the Invention.

The present invention relates to phenolic resins which are used in forming adhesives and, in particular, to resorcinolaldehyde resins which are used with curing agents in rubber to give improved tire cord to rubber adhesion.

2. Brief Description of the Prior Art.

Resorcinol-aldehyde resins are used as bonding agents in rubber to promote adhesion of steel cord to the rubber. Those resins generally have 10 to 20% unreacted resorcinol and produce objectionable fuming when added to the rubber. Also the resins are hygroscopic and may present a problem in storage and handling. Efforts to improve these resins by increasing the charge of formaldehyde to react with more of the resorcinol have not generally been successful. It has been found that there is a lowering of the amount of unreacted resorcinol, but the softening point of the resin becomes too high to allow compounding with rubber.

It is, therefore, an object of the invention to provide a resin that is low fuming, nonhygroscopic, low in free resorcinol and capable of cross-linkage with curing agents in rubber to give improved cord to rubber adhesion.

Summary of the Invention

We have found that vinyl compounds and, in particular, styrene can be reacted either with (1) the resorcinol or other phenolic compounds prior to reaction with formaldehyde or other aldehydes, or (2) reacted with the free resorcinol remaining after the resorcinol formaldehyde reaction is completed to give low fuming, nonhyrdroscopic resins of 0 to 5% free resorcinol. Suprisingly and unexpectantly, the softening point of the resin is not raised by the reaction with styrene and the adhesion to steel cord properties compared to conventional resins remain high.

Resins have also been successfully prepared using stripped crude resorcinol and blends of resorcinol and resorcinol still bottoms and the procedure is applicable for phenol-resorcinol formaldehyde type resins.

In one embodiment of the process of this invention, resorcinol and styrene are reacted at a molar ratio of 1 mole of resorcinol to 0.25 to 1.0 moles of styrene in presence of acid catalyst at 120° C. Thereafter formaldehyde is added at a molar ratio of 0.5 to 0.7 and reacted at 100° C, after which the reaction product is dehydrated In another embodiment of the process of this invention, resorcinol and formaldehyde are reacted at a molar ratio of 1 mole of resorcinol to 0.5 to 0.7 moles of formaldehyde at 100° C. The reaction product is then dehydrated, at atmospheric pressure to 140° C. Styrene at a molar ratio of 0.25 to 1.0 is then added to complete the reaction at 140-150° C.

Brief Description of the Drawings

The invention is further described with reference to the attached drawings in which.

Detailed Description

Figure 1:
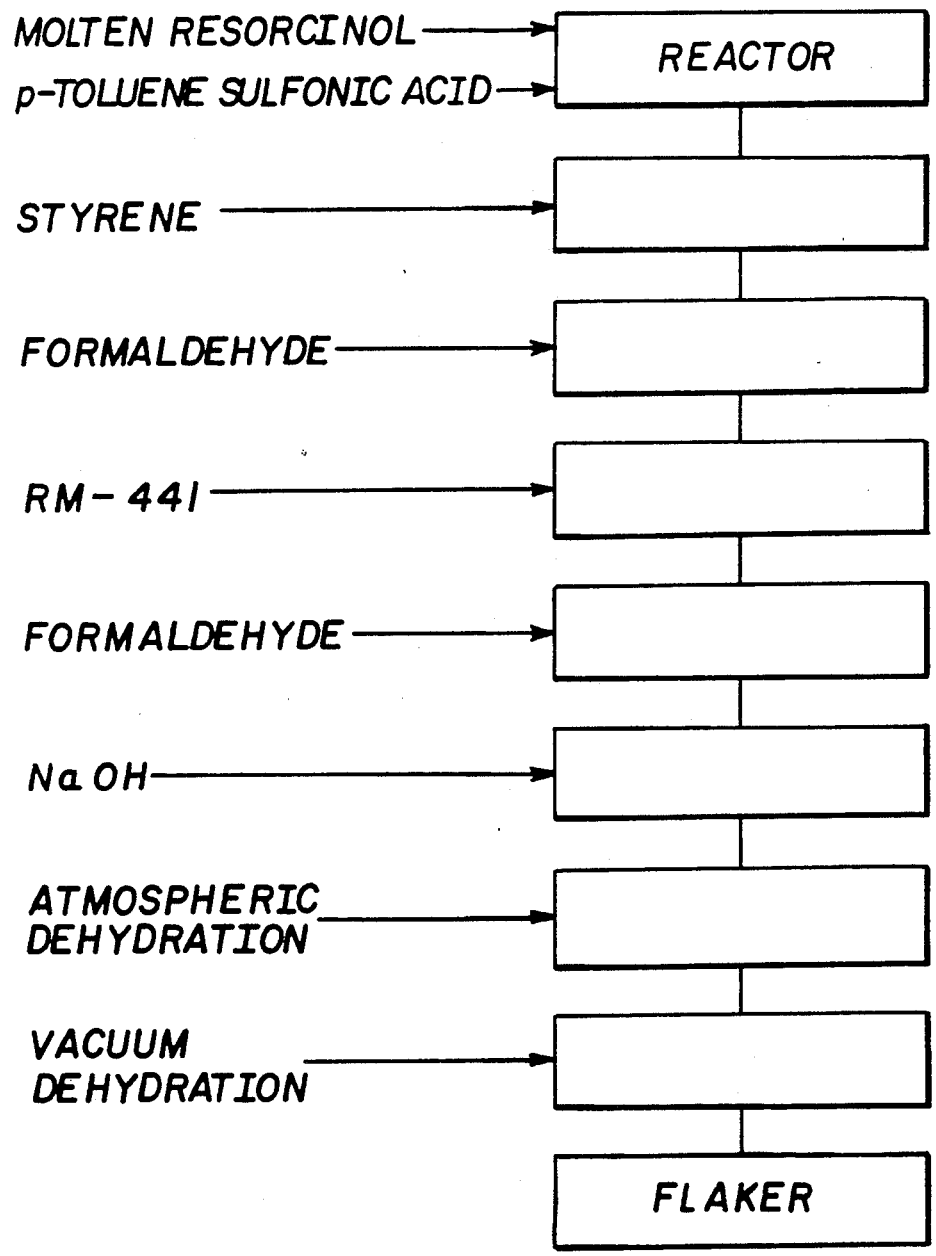
FIG. 1 is a flow diagram which illustrates a process which is a preferred embodiment of the present invention.

Referring to FIG. 1, one way to make the resin of the present invention is to first charge a reactor with molten resorcinol and an acid catalyst. Suitable catalysts would include, but not be limited to p-toluene sulfonic acid, and phenol sulfonic acid, toluene sulfonic and benzene m-disulfonic acid.

After 10 minutes of mixing the resorcinol and catalyst, styrene would then be added streamwise for a period of from $\frac{3}{4}$ to $1-\frac{3}{4}$ hours while the temperature is at 120°-140° C. After all the styrene has been added, the temperature is maintained at 120°-140° C. for $\frac{1}{2}$ hour.

Part of the formaldehyde is then added to the reactor streamwise over a period of 2 to $2-\frac{1}{2}$ hours. The reaction is exothermic and controlled by the rate of formaldehyde addition. The reactor temperature is preferably kept between 100°-120° C. and it should not exceed 135° C. After all the formaldehyde is added the mixture is held at reflux for 15 minutes.

Thereafter a commercially available resorcinol still residue known as RM-441 is preferably added in 80% solution over $\frac{1}{4}-\frac{1}{2}$ hour to the reactor while the reaction mixture is maintained at 80°-100° C. About 27 grams of this solution would preferably be used for each mole of resorcinol used. This residue is a mixture of resorcinol and 3,4'-dihydroxy diphenyl; 2,4,3'-trihydroxy diphenyl and higher molecular weight polymeric materials. Analysis of typical samples of such residue shows 2-8% resorcinol, 12-20% dihydroxy diphenyl and 25-35% trihydroxyl diphenyl and the higher molecular weight polymers making up the balance. RM-441 is commercially available from Koppers Company, Inc. located at Pittsburgh, Penna. USA.

The remainder of the formaldehyde is then added streamwise for an additional time of $\frac{1}{2}$ hour while the reaction mixture is maintained at 95°-100° C. after all formaldehyde is added and the mixture is held at reflux for 15 minutes. For each mole of resorcinol used, about 0.08 moles of sodium hydroxide are then charged to the reactor. Atmospheric distillation is conducted until a temperature of 145° C. is reached. A vacuum is applied to the kettle. As a vacuum is applied, the temperature will drop and the resin will foam. The rate that vacuum is applied must be controlled so that the temperature does not drop below 125° C. and the resin does not foam into the the vapor lines. When foaming has subsided, the vacuum should be applied in increments until full vacuum at least (95% or 715 mm Hg) is maintained. Pulling vacuum too rapidly may pull resin into the vapor header and condenser, plugging the condenser. When a temperature of 160° C. has been reached, vacuum is released and the kettle emptied, after which the finished resin is transported to a flaker to reduce it to about $\frac{1}{8}-\frac{1}{4}$ inch flakes. It may alternatively be broken into small pieces or ground to about $\frac{1}{4}$ inch pieces.

Figure 2:
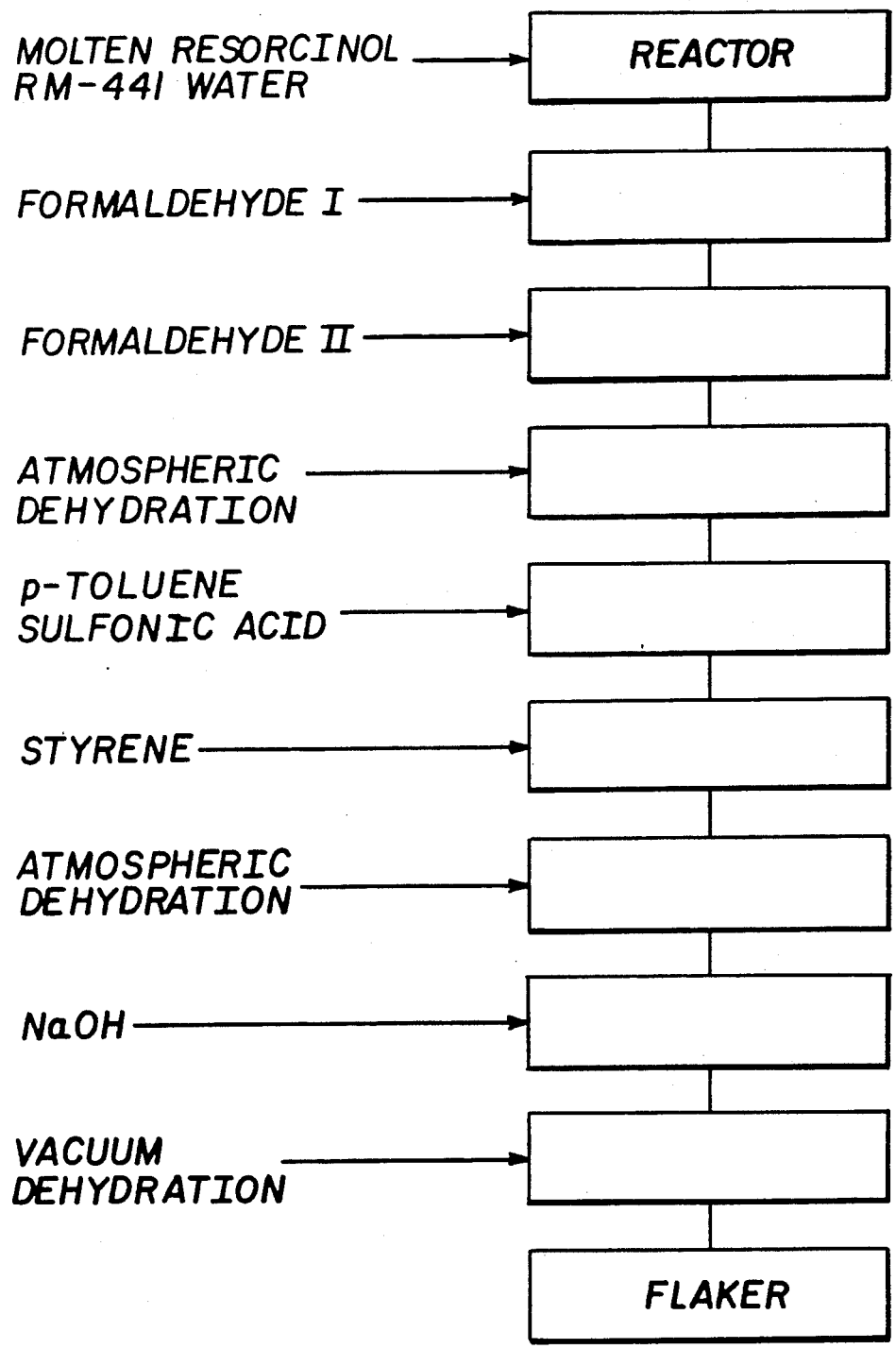
FIG. 2 is a flow diagram which illustrates a process which is an alternate embodiment of the present invention.

Referring to FIG. 2, the resin of the present invention may alternatively be produced by first charging water and resorcinol to the reactor. An agitator is used and, as necessary, the addition of resorcinol is stopped briefly to allow for the mixing of water and resorcinol. If the agitator labors or stalls heat may be put on the reactor, but the temperature of the mixture should not exceed 100° C. The resorcinol still residue 80% solution is then charged to the reactor and the mixture is heated to 100–120° C.

A 37% formaldehyde solution is then added to the mixture during an addition time of 2 to 2-½ hours. The reaction time is exothermic and is controlled by the rate of formaldehyde addition. Reactor temperature should not be allowed to exceed 135° C.

The formaldehyde is added in two increments, and when all of the first amount of formaldehyde has been added to the reactor, mixing is conducted for 10-15 minutes and a sample is withdrawn for a viscosity check. A high-intensity light may be required to see the bubble. The viscosity should be 30-36 Gardner Holdt seconds at 23° C. If the results obtained are within this range, an adjustment in the second formaldehyde charge may be necessary.

When all of the second amount of formaldehyde has been charged, the mixture is agitated for 10 minutes, a sample is withdrawn and viscosity checked. This result should be 45-85 seconds. If viscosity is not within this range, additional formaldehyde or resorcinol is added to obtain an endpoint within the acceptable range. The ideal endpoint would be 63 seconds.

Reactor valves are set for atmospheric distillation and atmospheric distillation is continued until a temperature of 110° C. is reached. When the reactor temperature reaches 110° C., p-toulene sulfonic acid is charged. Styrene is then added streamwise over a period of one hour. Distillation is continued during styrene addition and styrene is retained from water styrene azeotrope while removing water. When a temperature of 140° C. has been reached, the temperature is held at 140-145° C. for 30 minutes.

The kettle is switched to vacuum distillation. A vacuum is slowly applied to the kettle. As the vacuum is applied, the temperature will drop and the resin will foam. The rate that the vacuum is applied must be controlled so that the temperature does not drop below 125° C. and the resin does not foam into the vapor lines. When foaming has subsided, the vacuum should be applied in increments until full vacuum at least (95% or 715 mm Hg) is maintained. Pulling the vacuum too rapidly may pull resin into the vapor header and condenser, plugging the condenser.

When a temperature of 160° C. has been reached, the vacuum is released and the kettle is emptied. The completed resin is then flaked, broken into small pieces or ground to about ¼ inch pieces.

The process of the present invention is further illustrated by the following examples.

Example 1

440.4 grams Of resorcinol was charged to a flask and heated to 125° C. 0.8 g. of p-toluene sulfonic acid was then added and mixed for 10 minutes. 145 g. of styrene was then charged to the flask streamwise over a period of about 1 hour. Temperature was maintained at 125-135° C. for 1 hour after all of the styrene had been added. A 37% formaldehyde solution in the amount of 220 g. was then charged to the reactor streamwise over the formaldehyde was added, the mixture was held at reflux for 15 minutes. 0.2 g. of 50% solution of sodium hydroxide was added and water was then removed by atmospheric distillation to 145° C. and vacuum was applied and distillation continued to 160° C. When a temperature of 160° C. was reached, the vacuum was released and the flask emptied. The resulting resins had a softening point of 123° C. and a moisture content of 0.2%. Free resorcinol was 3.4 percent. The compound made by the reaction of resorcinol and styrene in the above described manner was identified by infrared (IR) and proton magnetic reasonance (NMR) procedures an found to have the following structure.

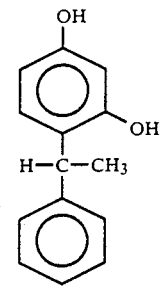

The compound made as a product of the entire above described procedure was analyzed by infrared (IR) and proton magnetic reasonance (NMR) procedures and indentified as having the following structure.

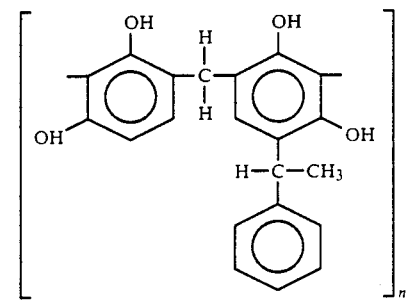

This disclosed resin was compared with a siica/black control nonbonding agent and a B-19S, a resorcinol-aldehyde resin rubber curing agent available from Koppers Company, Incl, Pittsburgh, Penna. Rheometer cure, hardness, tenile, adhesion and fuming characteristics were evaluated. The results of this test are shown in Table 1.

TABLE 1

| Property/Test | Control | B-195 Resin | Example 1 Product |
|---|---|---|---|
| Rheometer Cure (ASTM D-2084) | | | |
| MH (lbs.) | 37.3 | 41.2 | 37.6 |
| ML (lbs.) | 8.8 | 13.0 | 12.9 |
| t/2 (scorch time) (min.) | 5.0 | 2.8 | 3.5 |
| t′90 (cure time) (min.) | 15.3 | 32.5 | 39.0 |
| Hardness (Shore A) (ASTM D-2240) | 60 | 70 | 65 |
| Tensile (ASTM D-412) | | | |
| 300% Modulus (psi) | 1509 | 1687 | 1719 |
| Tensile Strength (psi) | 3809 | 2964 | 3178 |
| Ultimate Elong. (%) | 690 | 555 | 565 |
| Adhesion (ASTM D-2229) | | | |
| BW-49 Wire (Low Copper 63.5% Copper, 4.9 g./Kg plating) | 243(70) | 299(90) | 310(90) |
| Unaged | | | |
| Steam (24 hrs.) | 243(70) | 258(70) | 247(70) |
| Humidity (14 day) | 223(10) | 238(70) | 265(70) |
| BW-65 Wire (High Copper 67.5% Copper, 5.2 g./Kg) | 238(80) | 283(90) | 323(90) |
| Unaged | | | |
| Steam (24 hrs.) | 164(40) | 192(50) | 189(60) |
| Humidity (14 day) | 156(40) | 174(60) | 203(60) |
| Fuming (@ 250° C.) | not detected | detected visual-ed | not detected visually |

TABLE 1-continued

| Property/Test | Control | B-195 Resin | Example 1 Product |
|---|---|---|---|
| | visually | ly | |

Example 2

440 g. of resorcinol was charged to a flask and heated to 120–130° C. 0.7 g. of p-toluene sulfuric acid was then charged and mixed for ten minutes at 120–130° C. A 37% formaldehyde in the amount of 220.4 g. solution was charged over a period of 1 hour. When all of the formaldehyde was charged the flask was set for atmospheric distillation and atmospheric distillation was continued until a temperature of 140° C. was reached. When reactor temperature reached 140° C., 145.3 g. of styrene was added streamwise over a period of 90 minutes. Temperature was maintained at 135–140° C. and held at 140–150° C. for 1 hour after all the styrene had been added. The flask was then switched to vacuum distillation. When a temperature of 160° C. was reached, the vacuum was released and the flask emptied. The resulting resin had a softening point of 122° C. and a moisture content of .05%. Free resorcinol was 5.4%. A test similar to the one conducted on the product of the foregoing example was conducted on this product of this example. The results of this test are shown in Table 2.

TABLE 2

| Property/Test | Control | B-19S Resin | Example 1 Product |
|---|---|---|---|
| Rheometer Cure (ASTM D-2084) | | | |
| MH (lbs.) | 36.2 | 39.3 | 36.4 |
| ML (lbs.) | 8.7 | 11.2 | 11.0 |
| t/2 (scorch time) (min.) | 5.3 | 2.5 | 3.5 |
| t'90 (cure time) (min.) | 15.5 | 34.5 | 39.0 |
| Hardness (Shore A) (ASTM D-2240) | 60 | 70 | 70 |
| Tensile (ASTM D-412) | | | |
| 300% Modulus (psi) | 1427 | 1651 | 1689 |
| Tensile Strength (psi) | 3759 | 3190 | 3290 |
| Ultimate Elong. (%) | 700 | 600 | 600 |
| Adhesion (ASTM D-2229) | | | |
| BW-49 Wire (Low Copper 63.5% Copper, 4.9 g./Kg plating) Unaged | 214(70) | 324(95) | 307(90) |
| Steam (24 hrs. @ 120° C.) | 221(90) | 237(60) | 235(65) |
| Humidity (14 day @ 70° C., 95%) | 199(60) | 217(80) | 190(75) |
| BW-64 Wire (High Copper 67.5% Copper, 4.4 g./Kg) Unaged | 214(75) | 283(90) | 270(85) |
| Steam (24 hrs.) | 185(85) | 191(50) | 199(55) |
| Humidity (14 day) | 119(50) | 158(70) | 165(65) |
| Fuming (@ 250° C.) | not detected visually | detected visually | not detected visually |

Examples 3–6

The procedure of Example 1 was repeated four times except the amount of styrene used was varied as is shown in Table 3. The percentage of free resorcinol and the softening points of the resulting resins were measured and are shown in Table 3.

TABLE 3

| Example | Styrene (g.) | Free Resorcinol (%) | Softening Point (°C.) |
|---|---|---|---|
| 3 | 0.00 | 13.5 | 126.6 |
| 4 | 145.00 | 3.4 | 125.9 |
| 5 | 184.8 | 3.1 | 124.7 |
| 6 | 206.6 | 1.1 | 121.5 |

Examples 7–9

The procedure of Example 1 was repeated three more times except that the 440.4 g. of resorcinol, 0.8 g. p-toluene sulfonic acid, 204 g. of 37% formaldehyde solution and 0.3 g. of sodium dhydroxide were used and the amount of styrene was varied as is shown in Table 4. The percentage of free resorcinol and the softening points of the resulting resins were measured and are shown in Table 4.

TABLE 4

| Example | Styrene (g.) | Free Resorcinol (%) | Softening Point (°C.) |
|---|---|---|---|
| 7 | 0.00 | 15.5 | 114.8 |
| 8 | 145.00 | 7.9 | 112.6 |
| 9 | 224.00 | 2.5 | 112.0 |

Examples 10–15

The procedure of Example 2 was repeated six times except the amount of styrene sued was varied as is shown in Table 5. The percent of free resorcinol and the softening points of the resulting resins were measured and are shown in Table 5.

TABLE 5

| Example | Styrene (g.) | Free Resorcinol (%) | Softening Point (°C.) |
|---|---|---|---|
| 10 | 0.00 | 13.5 | 126.6 |
| 11 | 60.00 | 9.0 | 127.4 |
| 12 | 79.2 | 7.4 | 124.8 |
| 13 | 110.0 | 5.4 | 122.6 |
| 14 | 145.2 | 2.6 | 118.7 |
| 15 | 149.2 | 1.7 | 117.0 |

Examples 16–18

The procedure of Example 2 was repeated three more times except that 440.9 g. of resorcinol, 0.8 g. of p-toluene sulfonic acid, 204.0 g. of 37% formaldehyde solution and 0.3 g. of 50% sodium hydroxide solution were used, and the amount of the amount of styrene used was varied as is shown in Table 6. The percentage of free resorcinol and the softening points of the resulting resins were measured and ar shown in Table 6.

TABLE 6

| Example | Styrene (g.) | Free Resorcinol (%) | Softening Point (°C.) |
|---|---|---|---|
| 16 | 0.00 | 15.5 | 114.8 |
| 17 | 88.0 | 9.1 | 112.3 |
| 18 | 158.4 | 3.6 | 109.4 |

Examples 19

198 pounds of resorcinol was charged to a reactor and heated to 120–130° C. 0.3 pounds (147 grams) of p-toluene sulfuric acid was then similarly charged and mixed for 10 minutes at 120–130° C. Styrene was then charged to the reactor streamwise. The resulting reaction was exothermic and was controlled by the rate of styrene addition. The addition time was about 1 hour. Temperature was maintained at 125-135° C. for the reaction and then held at 135-145° C. for ½ hour after all of the styrene had been added. A 37% formaldehyde solution in the amount of 89.4 pounds was then charged to the reactor streamwise. The resulting reaction was exothermic and was controlled by the rate of formaldehyde addition. The reactor temperature was not allowed to exceed 135° C. Addition time for formaldehyde was about 2 hours. After all the formaldehyde was added, the mixture was held at reflux for 15 minutes. An 80% solution of RM-441 then was charged to the reactor streamwise in an amount of 27.5 pound. Addition time was about ½ hour. An additional 11.4 pounds of 37% formaldehyde solution was then added to the reactor streamwise. Addition time was about ½ hour. After all the formaldehyde had been added, the mixture was held at reflux for ¼ hour. 2 pounds of a 50% sodium hydroxide solution was then added and reactor valves were set for atmospheric distillation. Atmospheric distillation was continued until a temperature of 145° C. was reached. The kettle was then switched to vacuum distillation. The rate that the vacuum was applied was controlled so that the temperature did not drop below 125° C. and the resin did not foam into the vapor lines. When a temperature of 160° C. was reached, the vacuum was released and the kettle emptied. The resulting resins from several batches had a L g point of 117-123° C. and a moisture content of 0.7%. The softening point of 117-123° C. and a moisture content of 0.7%. The pH of a 40% aqueous alcohol solution was 5.0-6.0 Free resorcinol was 2.5-3.5%.

Example 20

9.7 pounds of water was charged to the reactor followed by 185.2 pounds of technical grade resorcinol. After each 50 pounds, or as needed, the addition was stopped and the agitator run briefly until the resorcinol and water were mixed after which charging was resumed. 25.7 pounds of an 80% solution of RM-441 was then charged to the reactor and the mixture was heated to 100-120° C. 89.4 pounds of a formaldehyde solution was then added to the reactor streamwise. The resulting reaction was exothermic and was controlled by the rate of formaldehyde addition. The reactor temperature was not allowed to exceed 135° C. Addition time for the formaldehyde was between 2 to 2-½ hours. When all of the formaldehyde has been added to the reactor, it was mixed for 10 minutes and a sample was withdrawn for a viscosity check. The viscosity was between 30-36 seconds at 23° C. Another 4.7 pounds of 37% formaldehyde solution was then added streamwise. When all of the second amount of formaldehyde was charged, the mixture was agitated for 10 minutes. A sample was withdrawn and viscosity checked. The results were from 45-85 seconds. Reactor valves were set for atmospheric distillation and continued until a temperature of 110° C. was reached. When reactor temperature reached 110° C., 1.2 pounds of p-toluene sulfonic acid were charged. 83.3 pounds of styrene were added streamwise over a period of one hour. Distillation was continued during styrene addition and styrene was returned from water styrene azeotrope while water was removed. Once a temperature of 140° C. was reached, the reaction was held at 140-145° C. for 30 minutes. The kettle was switched to vacuum distillation. The rate that the vacuum was applied was controlled so that the temperature did not drop below 125° C. and the resin did not foam into the vapor lines. When a temperature of 160° C. was reached, the vacuum was released and the kettle was emptied. The resulting resin had a softening point of 117°-128° C. and a moisture content of 0.7%. The pH of a 50% aqueous/alcohol L solution was from 5.0-6.0. It had 2.5-3.5% free resorcinol.

It will be appreciated that the above described resins are low fuming, nonhygroscopic and low in free resorcinol. Although the invention has been described with some particularity, it is to be understood that the present invention has been made only as an example and that the scope of the invention is defined by what is hereafter claimed.

What is claimed is:

1. A resorcinol formaldehyde resin having units represented by the formula

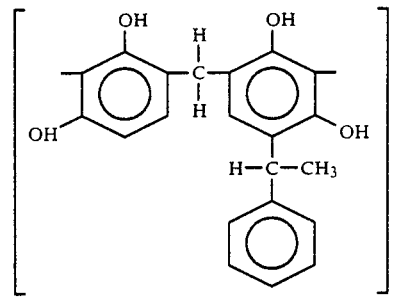

* * * * *

UNITED STATES PATENT AND TRADEMARK OFFICE
CERTIFICATE OF CORRECTION

PATENT NO. : 5,049,641

DATED : September 17, 1991

INVENTOR(S) : RICHARD T. HOOD and ROBERT M. LAMARS

It is certified that error appears in the above-identified patent and that said Letters Patent is hereby corrected as shown below:

Item [57] ABSTRACT: column 2, line 7, "structure." should be —structure—

Column 1, line 8, "resorcinolaldehyde" should be —resorcinol aldehyde—

Column 3, line 53, "Of" should be —of—

UNITED STATES PATENT AND TRADEMARK OFFICE
CERTIFICATE OF CORRECTION

PATENT NO. : 5,049,641

DATED : September 17, 1991

INVENTOR(S) : RICHARD T. HOOD and ROBERT M. LAMARS

It is certified that error appears in the above-identified patent and that said Letters Patent is hereby corrected as shown below:

Column 3, line 60, --a period of 30 minutes at a temperature of 100°-125° C. After all-- should be inserted after "over".

Column 4, second figure, line 35, "$n$" should be deleted from the lower right-hand corner of the figure to look as follows:

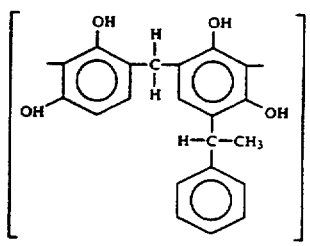

Column 4, line 37, "siica" should be --silica--.

Column 4, line 40, "Incl," should be --Inc.,--.

UNITED STATES PATENT AND TRADEMARK OFFICE
CERTIFICATE OF CORRECTION

PATENT NO. : 5,049,641
DATED : September 17, 1991
INVENTOR(S) : RICHARD T. HOOD and ROBERT M. LAMARS It is certified that error appears in the above-identified patent and that said Letters Patent is hereby corrected as shown below:

Column 6, line 14, "dhydroxide" should be --hydroxide--.

Column 6, line 30, "sued" should be --used--.

Column 6, line 54, "ar" should be --are--.

Column 6, line 63, "Examples" should be --Example--.

Column 7, line 29, "L g" should be --softening--.

Column 7, lines 30-31, "The softening point of 117-123° C. and a moisture content of 0.7%." should be deleted in its entirety.

Column 7, line 32, --.-- should be inserted after "5.0-6.0".

Column 8, line 24, "L" should be deleted.

Signed and Sealed this

Thirty-first Day of January, 1995

Attest:

BRUCE LEHMAN

*Attesting Officer*  *Commissioner of Patents and Trademarks*